April 18, 1933.    G. A. SEELEY    1,904,885
CAPSTAN
Filed June 13, 1930
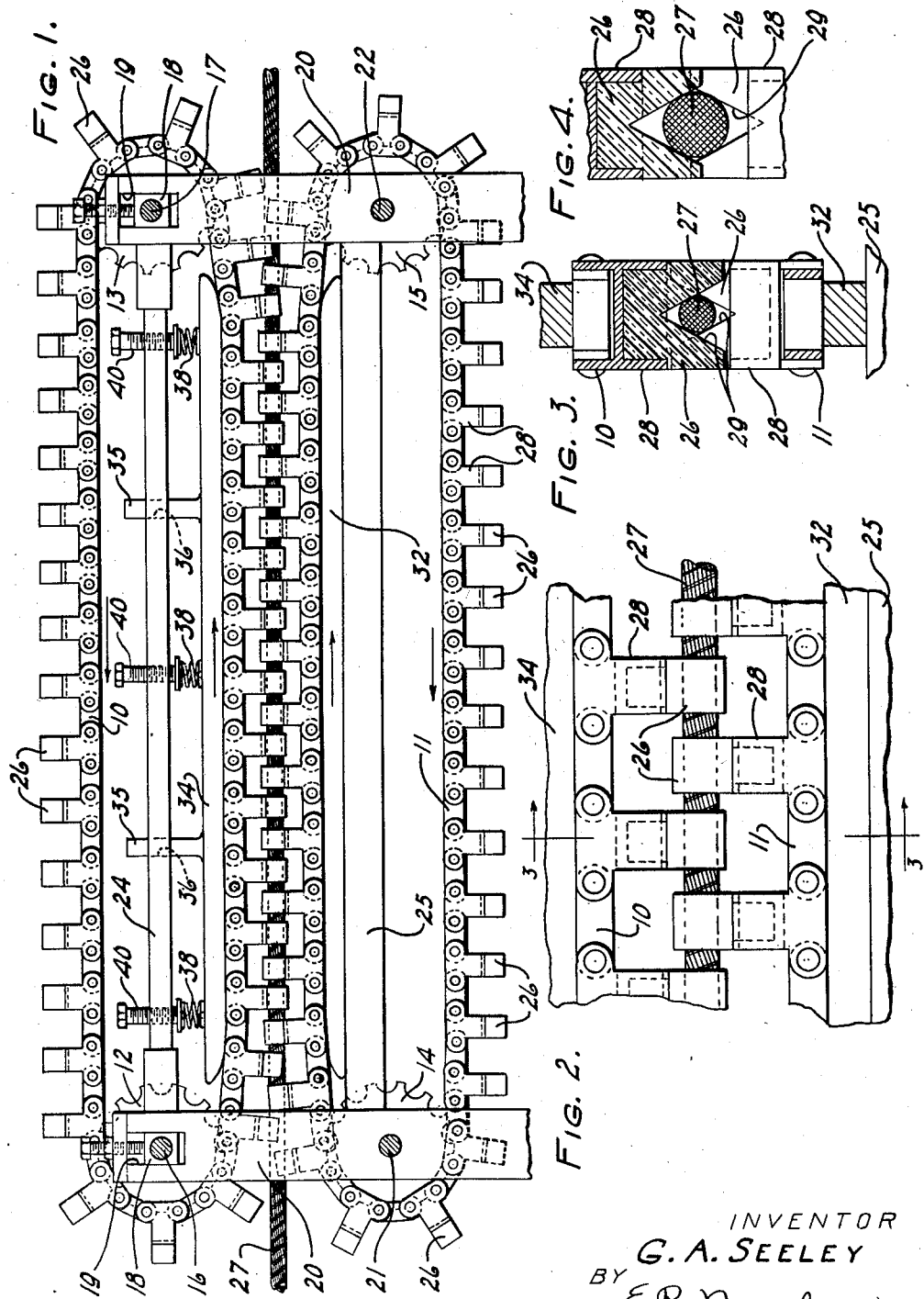
INVENTOR
G. A. SEELEY
BY E.R. Nowlan
ATTORNEY Patented Apr. 18, 1933

1,904,885

UNITED STATES PATENT OFFICE

GEORGE A. SEELEY, OF BALTIMORE, MARYLAND, ASSIGNOR TO WESTERN ELECTRIC COMPANY, INCORPORATED, OF NEW YORK, N. Y., A CORPORATION OF NEW YORK

CAPSTAN

Application filed June 13, 1930. Serial No. 460,867.

This invention relates to capstans, and more particularly to capstans of the caterpillar type for advancing strands, cables, and the like.

An object of the invention is to provide a capstan of simple and improved construction and capable of accommodating strands or cables of various shapes and sizes.

One embodiment of the invention contemplates the provision of a caterpillar capstan for advancing strands, cables, and the like, wherein a pair of cooperating endless belts or chains are arranged to travel around spaced driven discs or sprocket wheels and are provided with spaced gripping elements for engaging opposite sides of a strand or cable. The gripping elements are formed with deep V-shaped grooves for accommodating strands or cables of various shapes and sizes and are arranged so that the gripping elements of one chain are offset with respect to the gripping elements of the other chain.

A more complete understanding of the invention will be had from the following detailed description, reference being had to the accompanying drawing, wherein Fig. 1 is a skeletonized elevational view of a caterpillar capstan embodying the features of the invention;

Fig. 2 is an enlarged fragmentary view of a portion of the structure shown in Fig. 1;

Fig. 3 is a fragmentary section on line 3—3 of Fig. 2; and

Fig. 4 is a fragmentary section similar to Fig. 3 with the two chains spaced farther apart so as to accommodate a strand or cable of larger cross section.

The capstan illustrated in the drawing may be employed in conjunction with a cable making apparatus for drawing the finished cable from the various cable forming mechanisms and delivering it to a take-up reel. It will be obvious, of course, that caterpillar capstans embodying the features of this invention are capable of numerous other uses.

Referring to Fig. 1 of the drawing, it will be observed that the capstan of the present invention comprises a pair of spaced endless chains 10 and 11 which are arranged to travel around notched discs or sprocket wheels 12—13 and 14—15, respectively. The sprocket wheels 12 and 13 are secured to shafts 16 and 17, respectively, which are rotatably journalled in bearing blocks 18—18 adjustably mounted in vertical slots 19—19 in the upper ends of spaced uprights 20—20. The sprocket wheels 14 and 15 are secured to shafts 21 and 22, respectively, which are rotatably journalled in the uprights 20 and are disposed below and parallel to the upper shafts 16 and 17. The uprights 20 are rigidly interconnected by spaced horizontal cross bars 24 and 25.

The endless chains 10 and 11 are each provided with spaced outwardly projecting gripping blocks 26, 26, preferably composed of rubber, or other material adapted to exert a frictional gripping action upon a strand or cable 27 interposed therebetween. The gripping blocks are secured in socket portions 28, 28 (Fig. 3) of the chain links and are provided with deep triangular or V-shaped grooves 29, 29, whereby they are adapted to accommodate and firmly grip strands or cables of various shapes and sizes. It will be observed that the gripping blocks 26 of the upper chain 10 are offset with respect to the gripping blocks of the lower chain 11. This construction insures a constant uniform gripping engagement of the blocks with the cable which is not affected by variations or irregularities in the size or contour of the cable.

The lower chain 11 travels along a horizontal bed plate or guide shoe 32 extending between the sprocket wheels 14 and 15 and rigidly secured to the horizontal cross bar 25 of the frame. The upper chain 10 travels along the under side of a horizontal plate or guide shoe 34 which extends between the sprocket wheels 12 and 13 and is formed with upwardly extending guide pins 35—35 arranged to fit slidably in guide apertures 36—36 provided in the cross bar 24 of the frame, whereby the upper guide shoe 34 is vertically adjustable with respect to the lower guide shoe 32. The upper guide shoe 34 is yieldably urged downwardly toward the lower guide shoe 32 by coil springs 38, 38 interposed between the guide shoe 34 and adjusting screws 40, 40, threaded in the cross bar 24. From the construction just described it will be understood that the cable is firmly gripped by the grooved blocks 26 of the upper and lower chains under the pressure of the coil springs 38, which pressure may be varied by turning the adjusting screws 40. The capstan may be quickly and readily adjusted to accommodate strands or cables of various sizes by elevating or lowering the sprocket shaft bearing blocks 18 of the upper chain 10 and adjusting the tension of the coil springs 38.

It is believed that the operation of the improved caterpillar capstan will be clearly understood from the above description. The endless chains 10 and 11 are driven in the directions indicated by the arrows (Fig. 1) by any suitable source of power (not shown) connected to the sprocket wheel shafts 16, 17, 21 and 22. The strand or cable 27 is advanced with the moving chains through the frictional engagement of the grooved gripping blocks 26 of the upper and lower chains as they pass under and over the guide shoes 34 and 32, respectively. The deep V-shaped grooves 29 and the offset arrangement of the gripping blocks contribute to provide a simple and improved caterpillar capstan construction which is capable of accommodating strands or cables of various shapes and sizes.

It is to be understood that the invention is not limited to the particular embodiment thereof, herein illustrated and described except in so far as is defined by the appended claims.

What is claimed is:

1. A capstan for advancing strands, comprising a pair of endless members, and strand gripping elements secured to the members at spaced positions therealong, the gripping elements of one member being disposed in offset relation with respect to the gripping elements of the other member.

2. A caterpillar capstan for advancing strands, comprising a pair of endless chains, and a plurality of spaced strand gripping elements secured to the chains and having V-shaped grooves for accommodating strands of various sizes, the gripping elements of one chain being disposed in offset relationship with respect to the gripping elements of the other chain.

3. A caterpillar capstan for advancing cables, comprising a pair of endless chains arranged to travel in the same plane and disposed in spaced relationship, cable gripping elements secured to the chains at spaced positions therealong and having V-shaped grooves for accommodating cables of various shapes and sizes, the gripping elements of one chain being disposed in off-set relationship with respect to the gripping elements of the other chain, and means for moving one of the chains laterally with respect to the other chain.

4. A caterpillar capstan for advancing cables, comprising a pair of endless chains arranged to travel in the same plane and disposed in spaced relationship, a pair of rotatable elements for driving one of said endless chains, an individual shaft and bearing block for supporting each of said rotatable elements, an individual member having a vertical slot therein for supporting each of said bearing blocks, a cross bar having an aperture therein and extending between and secured to said individual members, a guide shoe associated with said one endless chain, a guide pin secured to said guide shoe and extending through the aperture in said cross bar, and cable gripping elements secured to the chains at spaced positions therealong and having V-shaped grooves for accommodating cables of various shapes and sizes, the gripping elements of said one chain being disposed in offset relationship with respect to the gripping elements of the other chain.

5. A caterpillar capstan for advancing cables, comprising a pair of endless chains arranged to travel in the same plane and disposed in spaced relationship, a pair of rotatable elements for driving one of said endless chains, an individual shaft and bearing block for supporting each of said rotatable elements, an individual member having a vertical slot therein for supporting each of said bearing blocks, a cross bar having an aperture therein and extending between and secured to said individual members, a guide shoe associated with said one endless chain, an adjusting screw secured to said cross bar, a spring located between the adjusting screw and the guide shoe, a guide pin secured to said guide shoe and extending through the aperture in said cross bar, and cable gripping elements secured to the chains at spaced positions therealong and having V-shaped grooves for accommodating cables of various shapes and sizes, the gripping elements of said one chain being disposed in offset relationship with respect to the gripping elements of the other chain.

6. A caterpillar capstan for advancing cables, comprising a pair of endless chains arranged to travel in the same plane and disposed in spaced relationship, a pair of rotatable elements for driving one of said endless chains, an individual shaft and bearing block for supporting each of said rotatable elements, an individual member having a vertical slot therein for supporting each of said bearing blocks, a cross bar having an aperture therein and extending between and secured to said individual members, a guide shoe associated with said one endless chain, an adjusting screw secured to said cross bar, a spring located between the adjusting screw and the guide shoe, a guide pin secured to said guide shoe and extending through the aperture in said cross bar, cable gripping elements secured to the chains at spaced positions therealong and having V-shaped grooves for accommodating cables of various shapes and sizes, the gripping elements of said one chain being disposed in offset relationship with respect to the gripping elements of the other chain, and means for moving said one chain laterally with respect to the other chain comprising a pair of adjusting screws associated with said members having vertical slots therein and with said bearing blocks.

In witness whereof, I hereunto subscribe my name this 2nd day of June A. D., 1930.

GEORGE A. SEELEY.